UNITED STATES PATENT OFFICE.

CHARLES MATTHEW ABBOTT, OF WATERTOWN, MASSACHUSETTS, ASSIGNOR TO POLYGON PRODUCTS COMPANY, OF BOSTON, MASSACHUSETTS, A CORPORATION OF MASSACHUSETTS.

COMPOUND FOR PENETRATING INTERIOR CORROSION.

1,333,363.

Specification of Letters Patent. Patented Mar. 9, 1920.

No Drawing. Application filed October 28, 1916. Serial No. 128,302.

*To all whom it may concern:*

Be it known that I, CHARLES M. ABBOTT, a citizen of the United States, residing at Watertown, county of Middlesex, Commonwealth of Massachusetts, have invented certain new and useful Improvements in Compounds for Penetrating Interior Corrosion, of which the following is a specification.

This invention relates to a compound especially adapted to penetrate minute interstices for the loosening of rust or other corrosive adhesion in such location, as for example to clean the threads of a nut and bolt or in any other place where a part to be removed is held against normal free movement. While this invention is capable of a great variety of use, its function in the removing of rusty nuts is so illustrative and so readily understood that the invention will be herein discussed largely with relation to its use for such a purpose and under such conditions.

Taking therefore for example the problem of loosening a nut having its threads rusted or otherwise corroded or held against rotation, it is to be noted that the larger the nut or other part to be removed and the greater the rusted or otherwise united surfaces, the more difficult and the more inaccessible the cause of trouble becomes. Obviously a small nut which requires little force to turn, may under certain conditions be wrenched free even though seriously rusted or otherwise held, but in the case of large nuts and other forms of threaded fastenings where the bearing surfaces are of considerable extent and where multiple threads of low pitch and normally close fit are employed, the problems of reaching interior rust and the like have been so difficult as to have been considered impracticable.

In addition to actual reaching of interior rust by a disintegrating agent, there is in most practical situations a need also for the presence in the locality of the interior rust of a lubricant, as most rust or corrosion is not eliminated, initially at least, but merely loosened, and the presence of a lubricant greatly facilitates the initial relative movement which permits the loosening and ultimate removing of the parts. The problem therefore involves not only the presence of a penetrating agent capable of disintegrating rust or other corrosion, but also a penetrating lubricant. Here again there is difficulty an account of the reluctance of viscous lubricant to enter capillary tubes or planes, and difficulty of holding against volatilization both a lubricant and a corrosion penetrant capable of penetrating such minute interstices. I have overcome, however, these difficulties by a combination of factors in which I combine a lubricant and a corrosion penetrating agent in such a way as causes the lubricant to act as a carrier having the function of retarding or practically preventing the evaporation of the corrosion disintegrant, while permitting the latter perfect freedom of penetration, while the corrosion disintegrant still retains its penetrating quality, coöperates with its lubricant as a carrier and in giving thereto a penetrating character.

While of course it is difficult and generally unsatisfactory to attempt any exact explanation of either physical or chemical action which can not be readily observed, it is believed that applicant's combination obtains a part of its result from the presence of a colloid which is carried in by the thin body of the penetrant in combination with the lubricant which with it has a low viscosity.

The combination and resultant action of compound in accordance with my mixture, may perhaps best be understood by taking as an illustrative compound one which has been found to be of great practical efficiency. My compound preferably consists of a penetrant, a colloid and a lubricant. The colloid preferably is colloidally soluble in the combined penetrant and lubricant and preferably tends to increase the viscosity as little as possible. The colloid must therefore bear a certain relation to the material used as the penetrant and lubricant. The penetrant in turn must bear certain relation to the lubricant as well as to the material upon which the compound is to be used, that is to say, the penetrant must not chemically react with the metal or material of the part or mechanism to be treated, must not have any reaction with the lubricant and preferably is a solvent for the lubricant.

The substances generally available for such penetrant are of a volatile nature but no more volatile than is necessary for the low degree of viscosity required. The lubricant must have the same absence of reaction upon the parts, and the penetrant should have a normal viscosity only so much greater than required for the purposes of lubrication when in the presence of interior rust as will be overcome by the solvent action of the penetrant while the combined materials are entering the interstices to reach the rusted or corroded surfaces. The lubricant should furthermore have as a property, a retarding effect upon the volatility of the penetrant.

As suggested heretofore, the adhesion of the parts between which relative movement is sought, as in the case of a removal of a nut may be of somewhat varied nature and may be either in the form of a hard brittle, gritty, or sticky nature or of other physical characteristics. The colloid should therefore be of average maximum efficacy for forming a protective colloid for those forms of rust, corrosion or other cause of sticking most common in practical usage.

The average cause in mechanisms of steel or iron is the ordinary rust or corrosion as in cases of parts of brass or similar alloys. Taking for example a compound especially adapted for the removal of metal parts, such as threaded fastenings of various sorts, I preferably employ a compound containing the following elements which are cited as illustrative of the principles of my invention while at the same time being practical for purposes of ordinary industrial use.

The compound may contain as a penetrant amylene, benzol, toluol, xylol, propyl benzol, iso-propyl benzol, octylene, octane, hexane, or similar hydro-carbons of low viscosity. Colloid should preferably contain coumarone resin, polymerized olefins, or polymerized unsaturated fatty oil. Any resins produced by polymerization of coumarone by any convenient process may be employed. The ordinary coumarone resin of commerce is found satisfactory. The lubricant may comprise higher aliphatic or naphthenic hydro-carbons or vegetable or animal oils. As an example of a compound which I have found advantageous, the following is given: by weight five parts xylol, three parts sperm oil, one part coumarone resin. These when they are mixed make a substantially permanent mixture from which the xylol does not readily evaporate and which when applied to a rusted part has a rapid action upon the rust material coupled with a suitable lubrication which makes the removal of the rusted part easy.

Various modifications may obviously be made in the combination as hereinbefore suggested and all without departing from the spirit of the appended claims.

What I therefore claim and desire to secure by Letters Patents is:

1. A penetrating adhesion freeing compound of the class described comprising in solution a mixture of liquid aromatic hydrocarbons of low viscosity and a polymerized olefin colloidally soluble therein and a lubricant.

2. The process of releasing rust films between adherent surfaces which consists in applying to the surfaces a liquid hydrocarbon of low viscosity and a material colloidally soluble therein, and a relatively viscous lubricant.

3. The process of releasing rust films between adherent surfaces which consists in applying to the surfaces a liquid hydrocarbon of low viscosity and a material colloidally soluble therein.

4. The process of releasing rust films between adherent surfaces which consists in applying to the surfaces a liquid hydrocarbon of low viscosity and a polymerized olefin colloidally soluble therein.

5. A penetrating adhesion freeing compound for releasing rust films between adherent surfaces, comprising a volatile, penetrating colloidal solvent having a volatilization retarding colloid in colloidal solution within it, said colloid having a lubricative character while in colloidal solution in the penetrating solvent, said colloid having also the property of retarding volatilization of the solvent while in solution therewith.

6. A penetrating adhesion freeing solution for releasing rust films between adherent surfaces comprising a volatile penetrating corrosion solvent and an oily vehicle for the solvent having a volatilization retarding relation to the solvent.

In testimony whereof I affix my signature in presence of two witnesses.

CHARLES MATTHEW ABBOTT.

Witnesses:
ARTHUR L. WILMARTH,
JANIE A. PECK.